(12) United States Patent
Nelson (10) Patent No.: US 11,828,322 B2
(45) Date of Patent: Nov. 28, 2023

(54) ATTACHABLE LOADING RAMP FOR MODULAR FLOATING VESSEL PLATFORMS

(71) Applicant: Bruce Nelson, Minneapolis,, MN (US)

(72) Inventor: Bruce Nelson, Minneapolis,, MN (US)

( * ) Notice: Subject to any disclaimer, the term of this patent is extended or adjusted under 35 U.S.C. 154(b) by 101 days.

(21) Appl. No.: 17/451,420

(22) Filed: Oct. 19, 2021

(65) Prior Publication Data

US 2022/0119077 A1 Apr. 21, 2022

Related U.S. Application Data

(60) Provisional application No. 63/093,592, filed on Oct. 19, 2020, provisional application No. 63/093,581, filed on Oct. 19, 2020, provisional application No. 63/093,578, filed on Oct. 19, 2020, provisional application No. 63/093,565, filed on Oct. 19, 2020.

(51) Int. Cl.

| | |
|---|---|
| *B63C 1/04* | (2006.01) |
| *F16B 7/02* | (2006.01) |
| *E02B 3/06* | (2006.01) |
| *B63B 35/44* | (2006.01) |
| *B63B 7/04* | (2020.01) |
| *B63B 27/14* | (2006.01) |
| *B63B 75/00* | (2020.01) |
| *B63C 3/00* | (2006.01) |
| *B63C 1/02* | (2006.01) |

(52) U.S. Cl.
CPC .................. *F16B 7/02* (2013.01); *B63B 7/04* (2013.01); *B63B 27/143* (2013.01); *B63B 35/44* (2013.01); *B63B 75/00* (2020.01); *B63C 1/02* (2013.01); *B63C 1/04* (2013.01); *B63C 3/00* (2013.01); *E02B 3/064* (2013.01)

(58) Field of Classification Search
CPC ........... B63B 27/143; B63C 1/00; B63C 1/02; B63C 1/04; B63C 1/06; B63C 1/08; B63C 1/10; B63C 1/12; B63C 3/02
See application file for complete search history.

(56) References Cited

U.S. PATENT DOCUMENTS

| | | | |
|---|---|---|---|
| 7,117,809 B2 | 10/2006 | Lamoureux et al. | |
| 2005/0172876 A1* | 8/2005 | Ostreng | B63C 1/02 114/45 |
| 2005/0217552 A1* | 10/2005 | Lamoureux | B63C 1/12 114/45 |
| 2009/0044740 A1* | 2/2009 | Imel | B63C 3/02 114/263 |

FOREIGN PATENT DOCUMENTS

CN 208199859 12/2018

\* cited by examiner

*Primary Examiner* — Andrew Polay
(74) *Attorney, Agent, or Firm* — Todd R. Fronek; Larkin Hoffman Daly & Lindgren, Ltd (57) ABSTRACT

A loading ramp includes a contoured component with upwardly sloping surfaces and an opening for receiving the hull of a watercraft. The contoured component has a centrally located lower surface relative to the sides and front of the contoured unit. The loading ramp incorporates a way for the loading ramp to attach to a modular floating vessel platform.

19 Claims, 9 Drawing Sheets

FIG.11

ATTACHABLE LOADING RAMP FOR MODULAR FLOATING VESSEL PLATFORMS

FIELD OF INVENTION

This description relates to a watercraft loading ramp unit that can be attached to floating vessel platforms. More particularly, the description details a device to guide watercraft of various types and sizes up and onto the top surface of a floating vessel platform which allows the watercraft to be stored out of the water.

BACKGROUND

Modular floating platforms have been in use for a number of years and are increasing both in popularity and applications. Modular floating platforms are typically constructed with molded plastic float modules that can be interconnected to form a variety of sizes and shaped floating platforms. Many modular floating platforms have been adapted for use as a floating vessel platform that provides a means of storing watercraft out of the water where a watercraft can be driven on top of the floating platform for dry storage. In such applications it is desirable to provide a means for watercraft with different hull sizes and shapes to be easily and safely propelled onto the floating vessel platform without damaging the hull of the watercraft or causing wear and tear on the floating vessel platform float modules.

Modular floating platforms are generally comprised of multiple floatation units that provide sufficient buoyancy and freeboard so as to maintain the top surface of the floating platform off of the surface of the water to keep people walking on the platform or equipment stored on the platform dry. In order to effectively utilize a modular floating platform as a floating vessel platform, at least one edge of the floating platform must be low enough to the water's surface to allow a watercraft to drive onto the platform. Some of the earlier attempts to provide a means for driving a watercraft onto a modular floating platform included filling float modules on the entrance edge of the platform with water in an attempt to lower the entrance point closer to the surface of the water.

Some modular floating platforms are constructed with float modules that have different heights, sometimes referred to as tall and short float modules. In order to provide for sufficient buoyancy for supporting watercraft, tall float modules are typically used in floating vessel platforms. By combining a limited number of short floats on the entrance edge of the floating vessel platform, with a majority of tall floats it was found that a sloped surface with a lower point of entry could be created to aid in driving watercraft onto the floating platform without the need to fill some of the float modules with water to reduce their buoyancy.

Still other floating vessel platforms have been constructed with one or more centrally located short float modules on the entrance edge of the floating vessel platform wherein at least part of the top surface of the short float module(s) are on a lower plane when attached to adjacent tall float modules, thereby creating a recessed entrance point for receiving the hull of a watercraft.

Even with these various designs, the entrance point on floating vessel platforms generally includes a vertical face, which for many watercraft acts as a curb that the watercraft must push itself up and over to be propelled onto the upper surface of the floating vessel platform. After repetitive use, there is often wear and tear on the float modules to the point where a breach in one or more of the float modules occurs, which allows water to fill the float modules, in turn reducing the buoyancy of the floating vessel platform to the point where it is no longer capable of supporting the hull of the watercraft out of the water. In some cases, the curb may prevent some watercraft from actually being capable of driving onto the platform. In other cases, the curb may cause the bow of the watercraft to rise dangerously high as the watercraft is propelled onto the floating vessel platform preventing the operator from being able to see the platform as the watercraft drives on, and when a sufficient length of the watercraft is on the floating vessel platform, the bow of the watercraft will come crashing down onto the platform as the watercraft comes to rest. In any of these situations, the hull of the watercraft can be damaged by the forces exerted against it as it is forced up and over the curb at the entrance point of the floating platform.

In addition to the problem of having to jump over a vertical face to access a floating vessel platform, it is also necessary to position the watercraft rather precisely at the entrance point of the floating vessel platform. In many cases, floating vessel platforms are comprised of float modules measuring approximately twenty inches wide including the float modules that form the entrance point. For inexperienced boaters, or anyone trying to position a watercraft on a windy day or in strong currents, it can be a challenge to position the bow of the watercraft at the proper location.

Other types of floating platforms have been adapted for use as a floating vessel platform that are comprised of one, or a limited number, of larger float modules rather than a plurality of smaller float modules. Such floating vessel platforms typically have a single piece center section float module designed to receive the hull of a watercraft. Such floating vessel platforms lack the flexibility that floating vessel platforms comprised of smaller float modules have where each of the connection points between the float modules can flex. As such, floating vessel platforms designed with single piece center channels are rigid and often require the addition of rollers and/or wheels to aid in propelling a watercraft onto the floating vessel platform. Another disadvantage of floating vessel platforms made with larger float modules is that they are heavy and more difficult to assemble and install as compared to floating vessel platforms comprised of smaller float modules.

SUMMARY

A ramp device is described that is attachable to a floating vessel platform. The ramp device defines an entry point and upwardly sloped sides and a connection point that connects with an edge of the floating vessel platform.

BRIEF DESCRIPTION OF THE DRAWINGS

Some embodiments of the concept are illustrated as an example and are not limited by the figures of the accompanying drawings, in which like references may indicate similar elements and which.

DETAILED DESCRIPTION OF THE INVENTION

The terminology used herein is for purposes of describing particular embodiments only and is not intended to be limiting of the description. The present disclosure is considered as an exemplification of the concepts presented herein and is not intended to limit the concepts to the specific embodiments illustrated by the figures or description below.

Figure 2:
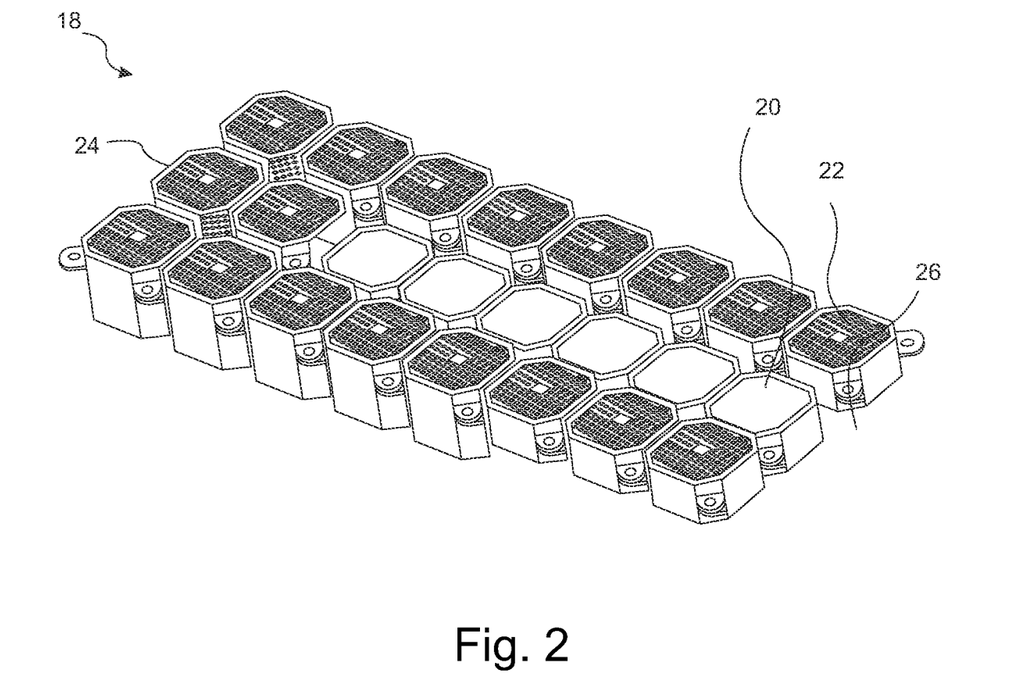
FIG. 2 is a perspective view of a floating vessel platform with short float modules attached to adjoining tall float modules that are greater in height than the short float modules.
Figure 3:
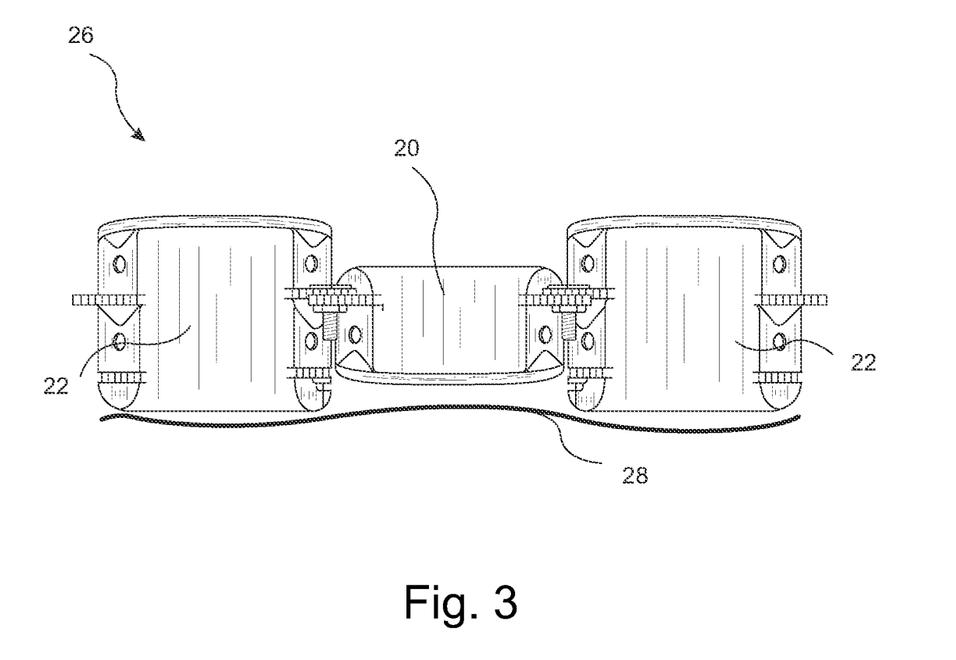
FIG. 3 is an end profile view of the floating vessel platform depicted in FIG. 2 with a short float module attached to adjoining tall float modules and illustrates relative height of the float modules from the surface of the water when floating.

Current floating vessel platforms have been designed with a combination of tall and short float modules as depicted if FIG. 2. This floating vessel platform 18 has short float modules 20 in a center channel of the platform and tall float modules 22 in adjoining side sections. The floating vessel platform has a front section 24 and an aft section 26, which is designed to receive a watercraft. FIG. 3 is an end profile view of the aft end 26 of the floating vessel platform 18 where a watercraft drives on to the floating vessel platform. At the aft section on the floating vessel platform 18 the short float modules 20 in the center channel are on a plane lower than the top surface of the tall float module 22 but are still positioned above the waterline 28 as illustrated in FIG. 3. In this instance, the center channel comprised of short floats 20 presents a blunt vertical faced entry point for a watercraft to overcome. As illustrated, the top surface of the short float module 20 are positioned approximately three-quarters above the bottom surface of the tall float modules 22, which are floating on the water surface 28. It can be noted that the short float modules 20 are actually suspended above the waterline 28. In order for a watercraft to gain entrance to the type of floating vessel platform 18 depicted in FIG. 2, it is necessary for the bow of a watercraft to step up and over the center float module 20, which presents a blunt force impact to the hull of a watercraft and the float module 20 as well as to the adjoining tall float modules 22 as the watercraft is propelled onto the floating vessel platform.

Figure 1:
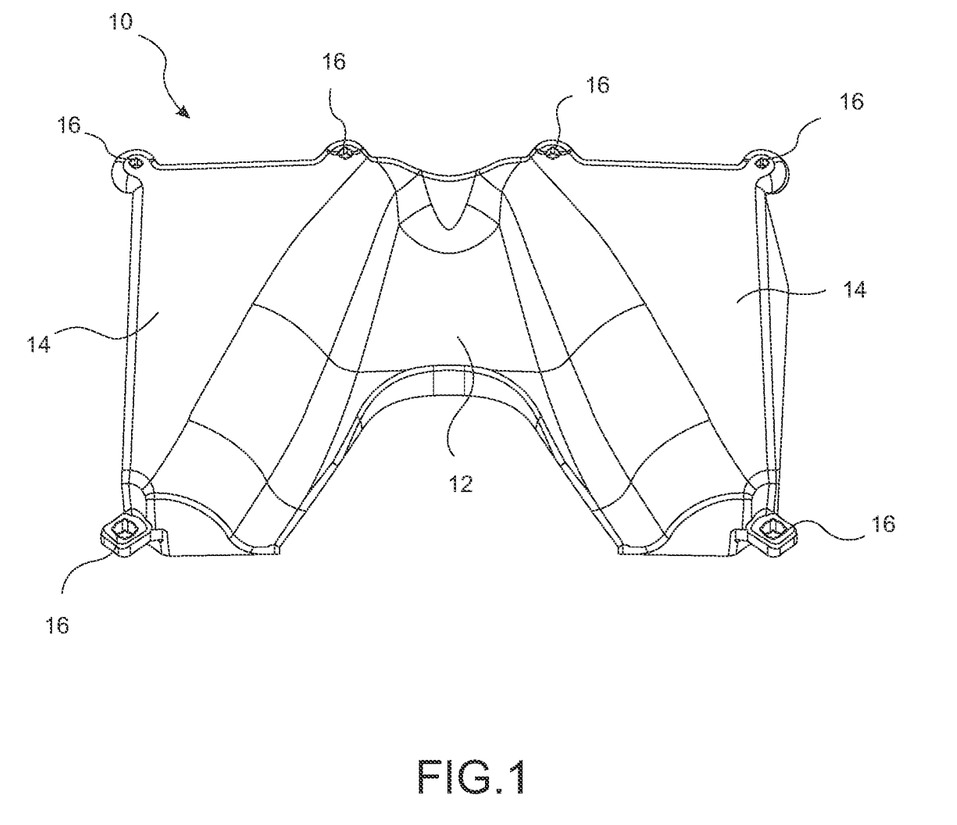
FIG. 1 is a perspective view of one example of an attachable loading ramp for a floating vessel platform.

In one embodiment, an attachable loading ramp is secured to the aft end of a floating vessel platform to provide a sloped surface that allows a watercraft to smoothly transition from the water surface to the top of the floating vessel platform as it is propelled onto the floating vessel platform. The attachable loading ramp 10 has a generally upwardly sloped shape from back to front with a partially open center section (e.g., U-shaped when viewed from a top of the ramp 10) that is on a lower plane than the adjacent side sections. FIG. 1 depicts a perspective view of an attachable loading ramp 10 for a floating vessel platform. In this embodiment, the ramp 10 has a rear facing entryway with a centrally located U-shaped lower ramp surface 12 that slopes upward from the reward section of the ramp to the forward section of the ramp and is on a plane lower than the plane of the upper surfaces 14 of the ramp. The center of the lower ramp surface 12 is more open in relation to the sides 14 of the ramp to create a centering point for the hull of a watercraft. In one embodiment, when viewed from a top of the loading ramp, the center open section is U-shaped.

In this embodiment of the concept, attachment points 16 are incorporated into the forward section and rearward section of the ramp that allow the ramp to be attached to a floating vessel platform assembly. The attachment points 16 can take several forms. In one embodiment, an attachment point includes a tab extending from a main body of the loading ramp and an aperture centrally located within the tab. In connecting to an adjacent float module, a fastener can be inserted through the aperture and connected to the adjacent float module. In other embodiments, the attachment point includes an integral connection mechanism (e.g., a tab, a projection) that connects directly with a corresponding mechanism on the adjacent float module. In any event, attachment points 16 are configured to connect ramp 10 to one or more adjacent float modules and maintain connection during operation of a floating vessel platform assembly.

Figure 4:
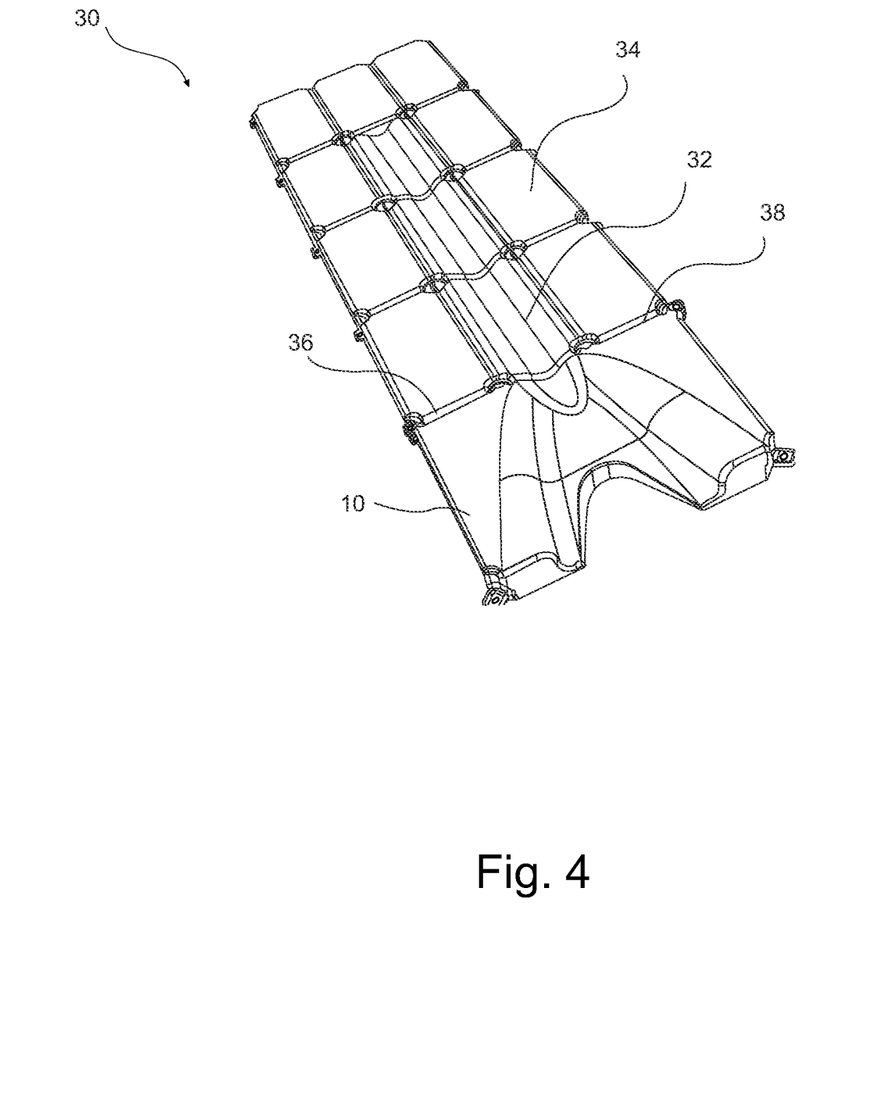
FIG. 4 is a perspective view of a floating vessel platform having center channel float modules that have a contoured "U" shaped upper surface and adjoining flat surface float modules on both sides of the contoured center float modules and an attachable loading ramp secured to a rear section of the floating vessel platform.

FIG. 4 depicts a perspective view of a floating vessel platform assembly 30 that is comprised of centrally located contoured keel receiving float modules 32 and adjoining full float modules 34 with an attachable loading ramp 10 secured to the aft section 36 of the floating vessel platform assembly 30. As can be seen, the attachable loading ramp 10 provides both a centering section or means for a watercraft to enter onto a floating vessel platform and a transition section or means for a watercraft to smoothly propel itself from the water up and onto the top surface of the floating vessel platform.

Figure 5:
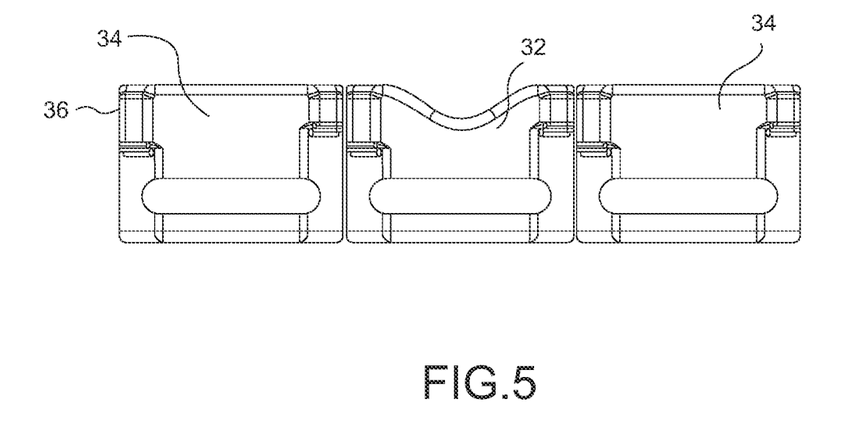
FIG. 5 is an end profile view of the floating vessel platform depicted in FIG. 4 without the attachable loading ram secured thereto.

FIG. 5 is a profile view of the aft end 36 of the floating vessel platform 30 depicted in FIG. 4 with a centrally located contoured keel receiving float module 32 and adjoining full float modules 34. It can be noted that in this embodiment, the centrally located contoured keel receiving float module 32 is the same overall height as the adjoining full float modules 34. In this way, the keel receiving float module 32 can float on the water's surface rather than be suspended above the waterline is as is the case, for example, with the short float module 20 depicted in FIG. 3. As such, the keel receiving float modules 32 provide additional buoyancy and load bearing capacity for the floating vessel platform assembly 30 depicted in FIG. 4.

Figure 6:
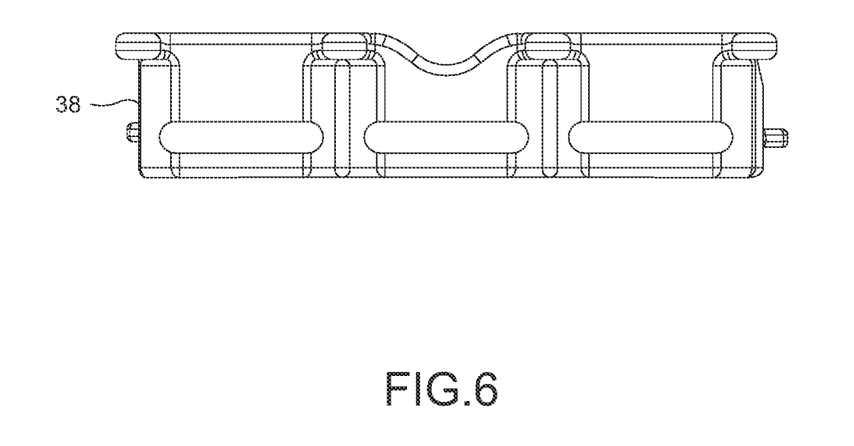
FIG. 6 is an end profile view of a front of the attachable loading ramp illustrating the shape of the attachable loading ramp that matches the shape of the end profile of the floating vessel platform depicted in FIG. 5.

In one embodiment, the attachable loading platform has a front profile that matches the rear profile of the floating vessel platform. FIG. 6 is a profile view of the forward end 38 of the attachable loading ramp depicted in FIG. 4. As shown, the forward end 38 of ramp 10 has a contoured center section and flat side sections that match the aft end 36 of the floating vessel platform assembly 30 depicted in FIG. 5. As such, when the attachable loading ramp 10 is secured to the floating vessel platform 30, the top surfaces of the attachable loading ramp 10 and the top surfaces of the floating vessel platform 30 are aligned, eliminating a vertical wall entry feature found on current floating vessel platforms.

Figure 7A:
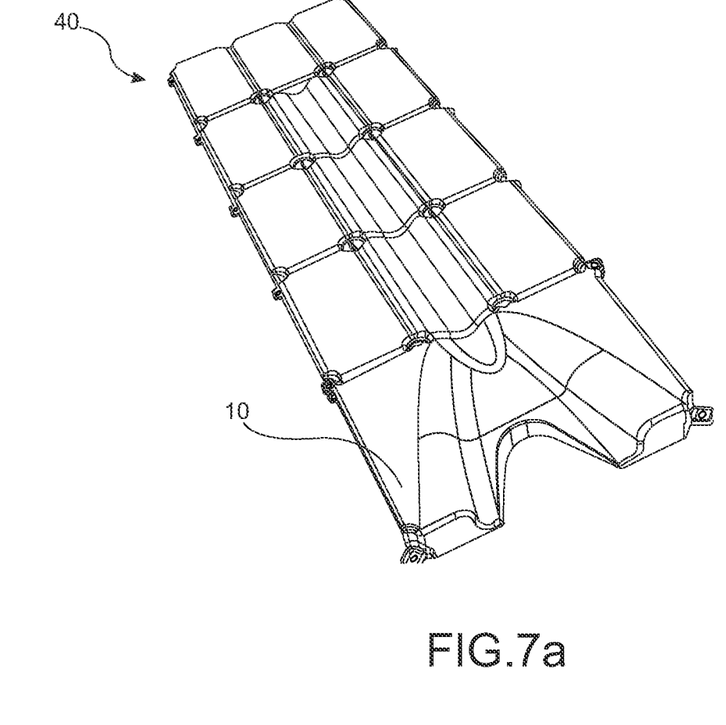
FIG. 7a is a perspective view of one example of a floating vessel platform with an attachable loading ramp that is designed for a smaller watercraft.
Figure 7B:
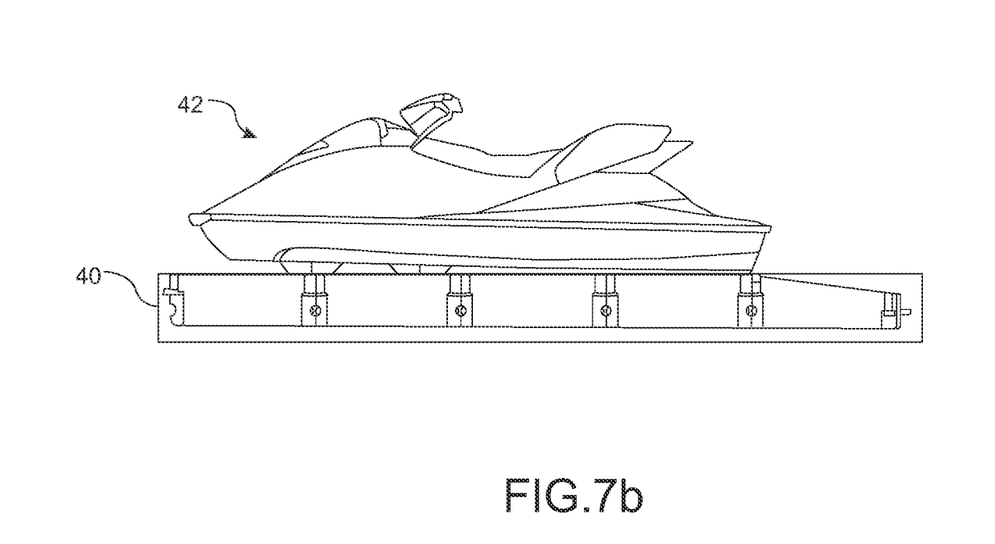
FIG. 7b is a side profile view of the floating vessel platform that is depicted in FIG. 7a with a smaller watercraft stored thereon.
Figure 8A:
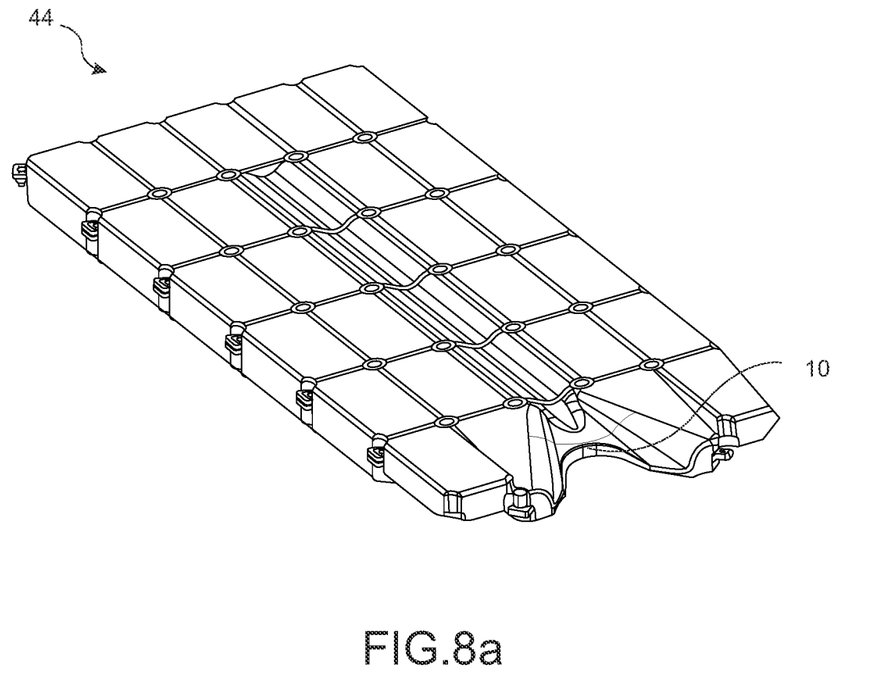
FIG. 8a is a perspective view of one example of a floating vessel platform with an attachable loading ramp that is designed for a larger watercraft.
Figure 8B:
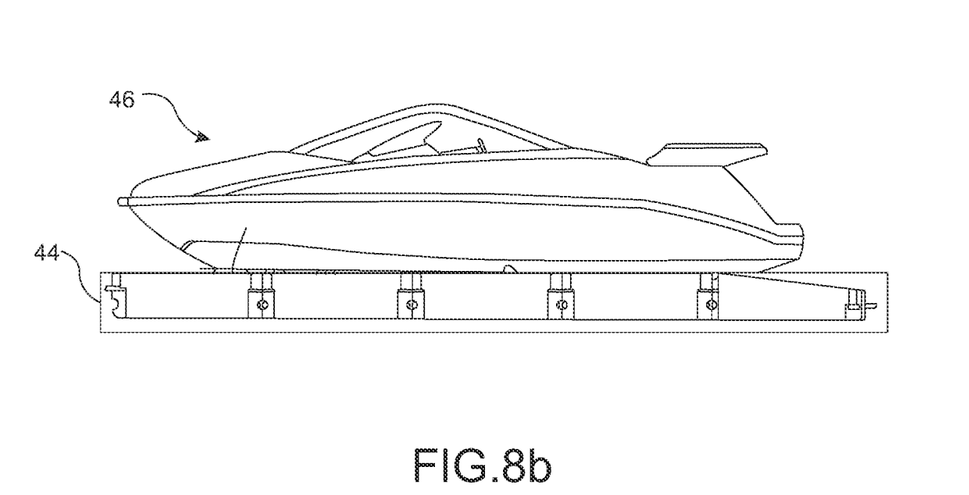
FIG. 8b is a side profile view of a floating vessel platform that is depicted in FIG. 8a with a larger watercraft stored thereon.
Figure 9A:
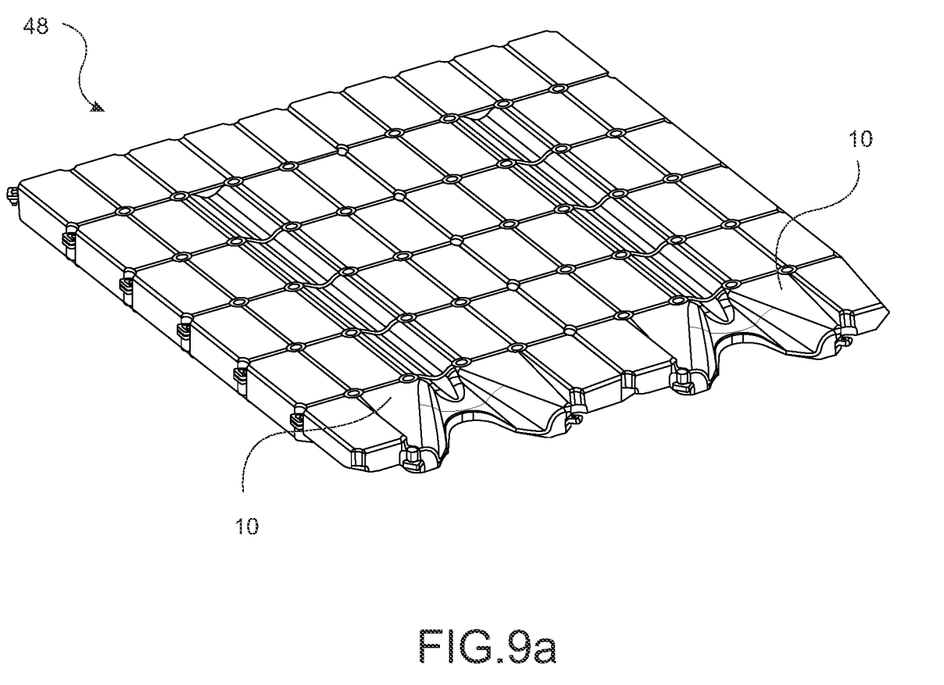
FIG. 9a is a perspective view of one example of a floating vessel platform with an attachable loading ramp that is designed for a multi-hull watercraft.
Figure 9B:
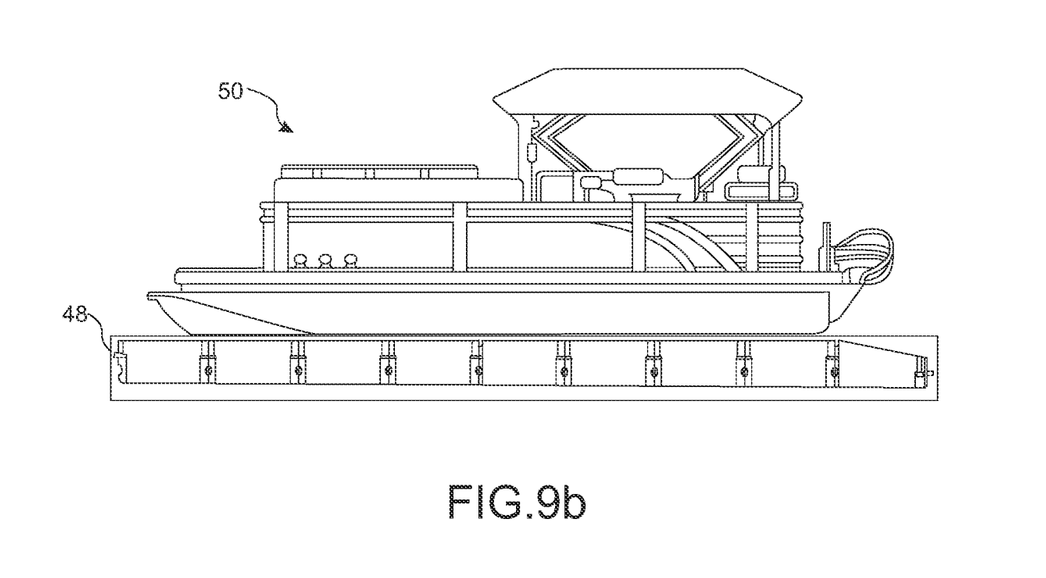
FIG. 9b is a side profile view of the floating vessel platform illustrated in FIG. 9a with a multi-hull watercraft stored thereon.

The attachable loading ramp 10 in FIG. 1 can be secured to a variety types and sizes of floating vessel platforms and can be adapted for use by different types of watercraft as illustrated in FIGS. 7a &b, 8a&b and 9a&b. FIGS. 7a and 7b illustrate the use of the attachable loading ramp 10 with a floating vessel platform 40 designed for use by a smaller watercraft 42 such as a personal watercraft (PWC). FIGS. 8a an 8b illustrate the use of the attachable loading ramp 10 with a floating vessel platform 44 designed for use by a larger watercraft 46 such as a deep V boat. FIGS. 9a an 9b illustrate the use of two attachable loading ramps 10 with a floating vessel platform 48 designed for use by a multi-hull watercraft 50 such as a pontoon boat. In each instance, the attachable loading ramp provides for a centering mechanism to guide the watercraft into position and a transition mechanism, which allows the watercraft to smoothly ride up and onto the floating vessel platform.

Figure 10:
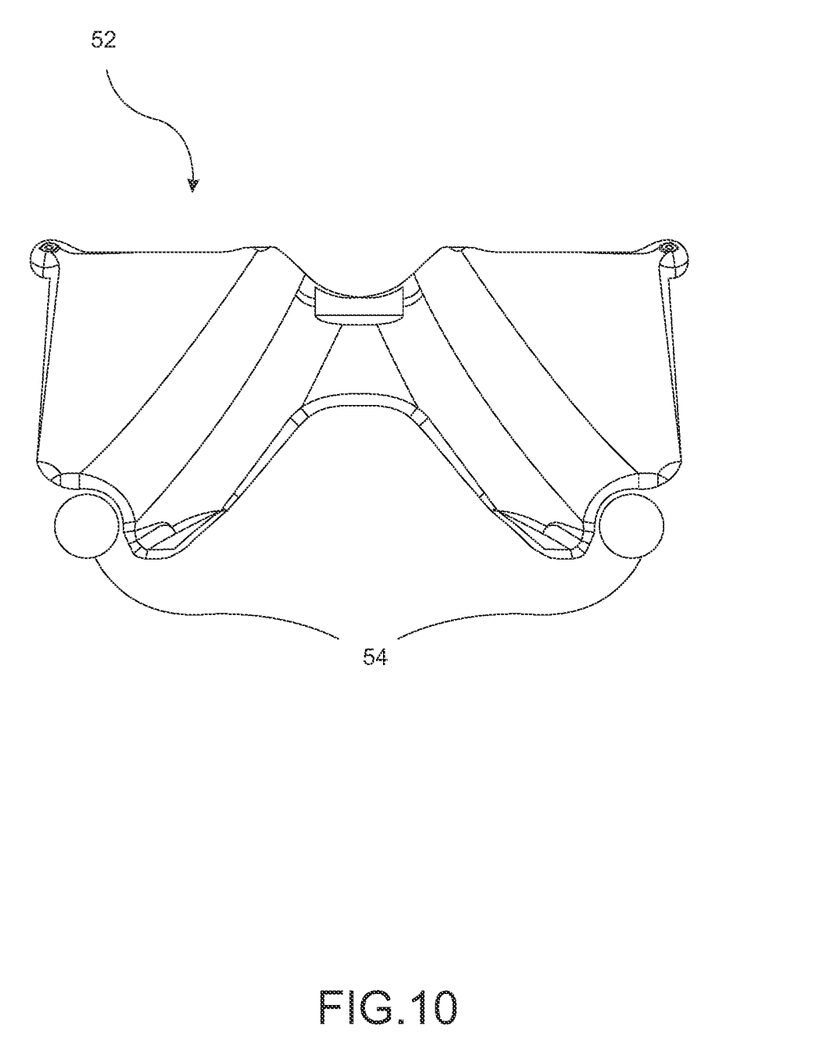
FIG. 10 is a perspective view of an alternate example of an attachable loading ramp with buoyant material connected thereto.

In one embodiment the attachable loading ramp 10 in FIG. 1 is a hollow airtight flotation module that provides buoyancy. In an alternative embodiment, the attachable loading ramp is comprised of a contoured unit 52 without internal chambers as shown in FIG. 10. As may be desired, floatation material 54 of different types, sizes and shapes such as those illustrated in FIG. 10 may be secured to the attachable loading ramp 52 to provide buoyancy.

Figure 11:
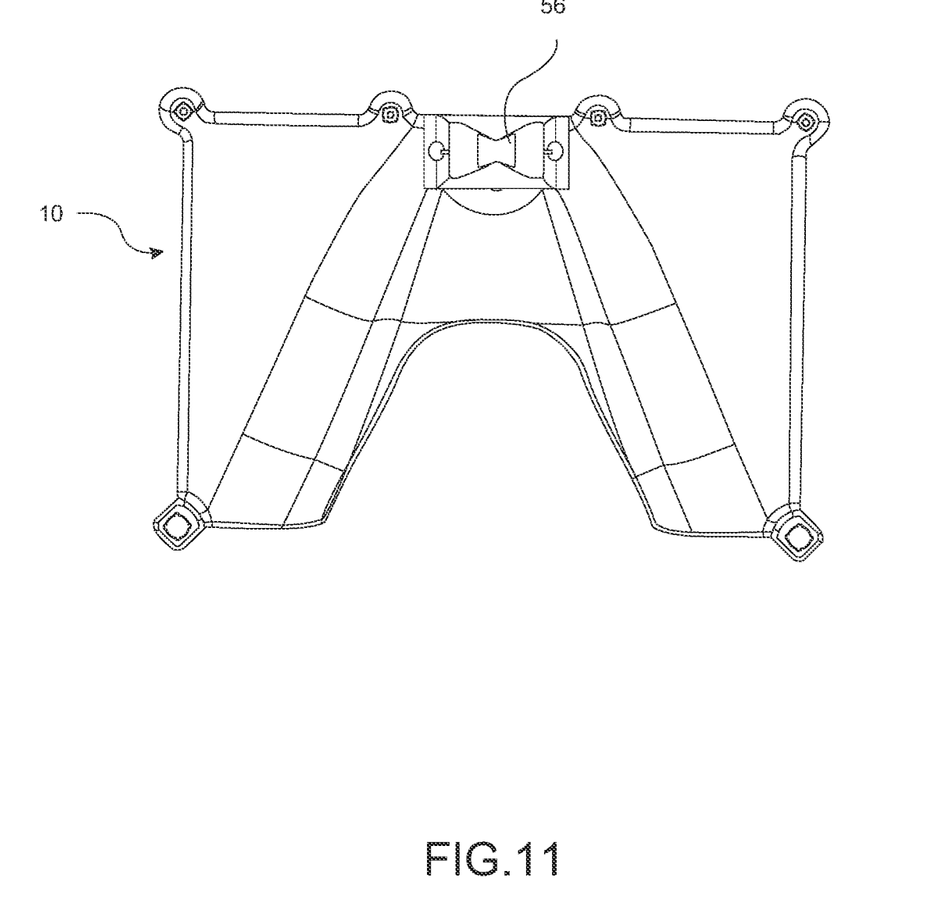
FIG. 11 provides a top view of an example of an attachable loading ramp with an attachable keel roller.

FIG. 11 illustrates another embodiment of the concept, where one or more roller devices 56 can be installed into the attachable loading ramp 10 to facilitate the movement of a watercraft over the ramp and onto a floating vessel platform.

A floating vessel platform with an attachable loading ramp secured to it such as the ramp described herein provides for a safer, more convenient and less damaging means to propel various types of watercraft up and onto modular floating platforms that are intended to support a watercraft without the need to use a single piece center section float which does not provide the flexibility that multiple center section float modules provide. As a watercraft approaches a floating vessel platform with the attachable loading ramp, the comparatively wider opening in the aft section of the ramp provides a guidance means to properly align the watercraft hull with the floating vessel platform. As the watercraft continues its forward motion, the hull of the watercraft comes into contact with the lower section of the ramp which will allow the watercraft to be gently guided upward towards the floating vessel platform. At the point where the front edge of the ramp is secured adjacent to the aft edge of the floating vessel platform, both the contoured and flat surfaces of the ramp and the floating vessel platform match up so that there is no vertical wall or "curb" that the watercraft must overcome to gain entrance onto the floating vessel platform, thereby eliminating wear and tear on the floating vessel platform float modules and eliminating potential damage to the watercraft's hull. As the watercraft continues its movement onto the floating vessel platform, the bow of the watercraft will remain fairly level to allow the watercraft operator a better line of sight as the watercraft moves forward and reaches its final resting spot on the floating vessel platform. Thus, it can be seen that users of my attachable loading ramp will find it to be a valued addition to floating vessel platforms that will make the drive on platform experience less stressful and extend both the useful life of the floating vessel platform and the appearance and condition of the hull of their watercraft.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

What is claimed is:

1. A loading ramp extending from a back end to a forward end that can be attached to a modular floating vessel platform for aiding in guiding and elevating a watercraft up and onto the floating vessel platform comprising:
    an open center section configured to allow entrance of a watercraft onto the floating vessel platform from the back end, the open center section generally u-shaped when viewed from a top of the loading ramp;
    a contoured component to propel the watercraft from the water up and onto a top surface of the floating vessel platform, the contoured component including a lower ramp surface connected to the open center section and upward sloping sides on either side of the lower ramp surface, the upward sloping sides converging toward one another such that the upward sloping sides are closer to one another near the forward end than the back end.

2. The loading ramp of claim 1,
    wherein the contoured component includes a forward section shaped to receive a hull of the watercraft, and wherein an attachment point is configured to attach said contoured component to said floating vessel platform.

3. The loading ramp of claim 2, wherein the contoured component defines a generally u-shaped upper surface.

4. The loading ramp of claim 2, wherein the sloping slides converge upwardly from the forward section to an aft section opposite the forward section.

5. The loading ramp of claim 1, wherein an outer perimeter of the loading ramp is generally rectangular.

6. The loading ramp of claim 5, wherein each of a plurality of attachment points are disposed about the outer perimeter.

7. The loading ramp of claim 1, wherein each sloping side includes a top planar surface.

8. The loading ramp of claim 1, wherein the loading ramp is formed of a hollow airtight flotation module.

9. The loading ramp of claim 2, further comprising floatation material connected with the contoured component.

10. The loading ramp of claim 2, further comprising a roller positioned on the contoured component.

11. A floating vessel platform, comprising:
    a plurality of float modules defining a forward end and an aft end, the plurality of float modules including at least one keel receiving float module defining an upper contoured surface and first and second float modules positioned on either side of the at least one keel receiving float module; and a loading ramp including an open center section that is generally u-shaped when viewed from a top of the loading ramp, a sloping surface including a contoured component, and a plurality of attachment points, each of the plurality of attachment points connecting the loading ramp to the aft end of each of the first float module, the second float module and the at least one keel receiving float module such that the upper contoured surface and the sloping surface are positioned adjacent one another and wherein adjacent edges of the upper contoured surface and the sloping surface are positioned at an equal height relative to one another, the contoured component including a lower ramp surface connected to the open center section and upward sloping sides on either side of the lower ramp surface, the upward sloping sides converging toward one another such that the upward sloping sides are closer to one another near the aft end than a front edge of the loading ramp.

12. The floating vessel platform of claim 11, wherein the sloping surface is generally u-shaped.

13. The floating vessel platform of claim 11, wherein the sloping surface increases in height from a first end to a second end of the loading ramp.

14. The floating vessel platform of claim 11, wherein the plurality of float modules includes a plurality of keel receiving float modules.

15. The floating vessel platform of claim 11, wherein the plurality of float modules includes a plurality of float modules having a generally planar upper surface.

16. The floating vessel platform of claim 11, wherein the loading ramp is formed of a hollow airtight flotation module.

17. The floating vessel platform of claim 11, wherein the loading ramp includes floatation material positioned on an underside of the loading ramp.

18. The floating vessel platform of claim 11, wherein the loading ramp includes a roller positioned on the sloping surface.

19. The floating vessel platform of claim 11, further including a second loading ramp connected with the aft end.

* * * * *

UNITED STATES PATENT AND TRADEMARK OFFICE
CERTIFICATE OF CORRECTION

PATENT NO. : 11,828,322 B2
APPLICATION NO. : 17/451420
DATED : November 28, 2023
INVENTOR(S) : Bruce Nelson It is certified that error appears in the above-identified patent and that said Letters Patent is hereby corrected as shown below:

On the Title Page

Item (71) Applicant after "Nelson," delete "Minneapolis,," and insert -- Minneapolis, --

Item (72) Inventor after "Nelson," delete "Minneapolis,," and insert -- Minneapolis, --

Signed and Sealed this
Twenty-third Day of January, 2024

Katherine Kelly Vidal
*Director of the United States Patent and Trademark Office*